United States Patent [19]

Felten

[11] Patent Number: 4,667,574

[45] Date of Patent: May 26, 1987

[54] ACTUATOR FOR MOVEMENT OF A TOOL AND A TIRE CARCASS TRANSFER DEVICE UTILIZING THE ACTUATOR

[75] Inventor: Gilbert Felten, Luxembourg, Luxembourg

[73] Assignee: The Goodyear Tire & Rubber Company, Akron, Ohio

[21] Appl. No.: 666,795

[22] Filed: Oct. 31, 1984

[51] Int. Cl.[4] ............................................. F01B 11/02
[52] U.S. Cl. ...................................... 92/85 A; 92/61; 92/114; 92/131; 92/133; 92/165 PR; 156/396
[58] Field of Search ................... 92/7, 85 A, 131, 109, 92/114, 13.4, 10, 85 B, 113, 61, 133, 165 PR; 173/19

[56] References Cited

U.S. PATENT DOCUMENTS

| | | | |
|---|---|---|---|
| 2,594,494 | 4/1952 | Rappl | 92/85 B |
| 2,913,919 | 11/1959 | Malkiewicz | 92/131 |
| 3,420,148 | 1/1969 | Doerfer | 92/113 |
| 3,667,350 | 6/1972 | Engle | 92/113 |
| 3,804,397 | 4/1974 | Neumann | 294/64.1 |
| 3,822,635 | 7/1974 | Nishimura | 92/13.5 |
| 3,878,769 | 4/1975 | Farmer | 92/131 |
| 3,929,057 | 12/1975 | Kondo | 92/10 |
| 4,111,311 | 9/1978 | Hirama | 92/85 B |

FOREIGN PATENT DOCUMENTS 2046164  3/1972  Fed. Rep. of Germany ....... 92/13.6

*Primary Examiner*—Abraham Hershkovitz
*Attorney, Agent, or Firm*—T. P. Lewandowski

[57] ABSTRACT

A tire carcass transfer device (111) having a hollow housing (112) for receiving a tire carcass (160), a plurality of flexible cups (21) arranged in a circular band around the housing, vacuum means connected to the cups (21) and fluid powered actuators (10) for radial movement of the cups. The actuators (10) each have a return spring (24) therein to move piston (14) of the actuator (10) radially outwards by a predetermined amount on cessation of operation of the fluid powered actuator. Since all the pistons (14) are moved the same distance outwards by their respective springs (24), distortions to the carcass from its circular shape are minimized. An actuator (10) having a return spring (24) operating on a rod (15) operably connected to a piston (14) to return the actuator piston to a mid stroke position is also described.

7 Claims, 6 Drawing Figures

ACTUATOR FOR MOVEMENT OF A TOOL AND A TIRE CARCASS TRANSFER DEVICE UTILIZING THE ACTUATOR

BACKGROUND OF THE INVENTION

The present invention relates to a tire carcass transfer device which includes a plurality of actuators operable for movement of flexible cups and also to an actuator operable for movement of a tool. The invention is particularly useful in relation to fluid powered actuators and more specifically to pneumatic actuators.

A typical prior art transfer device has a cylindrical hollow housing and is moveable over a tire carcass building drum so as to enable the transfer device to pick up the cylindrical carcass. During the carcass pick up, the carcass may become distorted from its circular shape. The present invention seeks to reduce this carcass distortion.

Furthermore, also disclosed in the present invention is an actuator operable for movement of a tool, and which on cessation of operation of the actuator will return a tool to a predetermined position which corresponds with a mid stroke position of the actuator.

SUMMARY OF INVENTION

According to the invention there is provided a tire carcass transfer device for transferring an uncured tire carcass from a carcass building machine to a tire building and forming machine and including:

a hollow housing for receiving a substantially cylindrical tire carcass, a plurality of flexible cups disposed in at least one circular band about the housing, a means for evacuating air from said cups, and actuators connected one to each respective flexible cup, and operable to each have a radial stroke for radial movement of a respective cup, to enable said cups to contact the outer cylindrical surface of a carcass, said actuators each including a return spring effective to move the respective cup radially outwards by a predetermined distance which is less than the full radial stroke of the actuator, after cessation of operation of the actuators.

The terms 'radial' and 'radially' refer to the radial direction relative to the cylindrical carcass.

Also according to this invention there is provided an actuator operable for movement of a tool and which comprises, an actuator body, a piston having a reciprocating stroke within the actuator body, a rod operably connected with the piston and which is connectable with said tool, a first abutment associated with the rod and having a fixed axial position along the rod, a second abutment also associated with the rod and being axially displaceable along the rod, return spring means biasing the first and second abutments apart, and a third abutment having a fixed position and which is operably engageable by the first abutment after a predetermined movement of the piston along its stroke, so that continued movement of the piston along said stroke results in compression of the spring means so that on cessation of operation of the actuator, the spring returns the piston to a mid stroke position.

The terms 'axial' and 'axially' refer to displacements along the longitudinal axis of the rod.

The return spring can be housed within the rod, and the rod can pass through the actuator body and be fixed coaxially with the piston or alternatively the rod can be external of the actuator body and be connected to the piston by a yoke.

DESCRIPTION OF DRAWINGS

The invention will be described by way of example and with reference to the accompanying drawings in which.

DETAILED DESCRIPTION OF INVENTION

Figure 5:
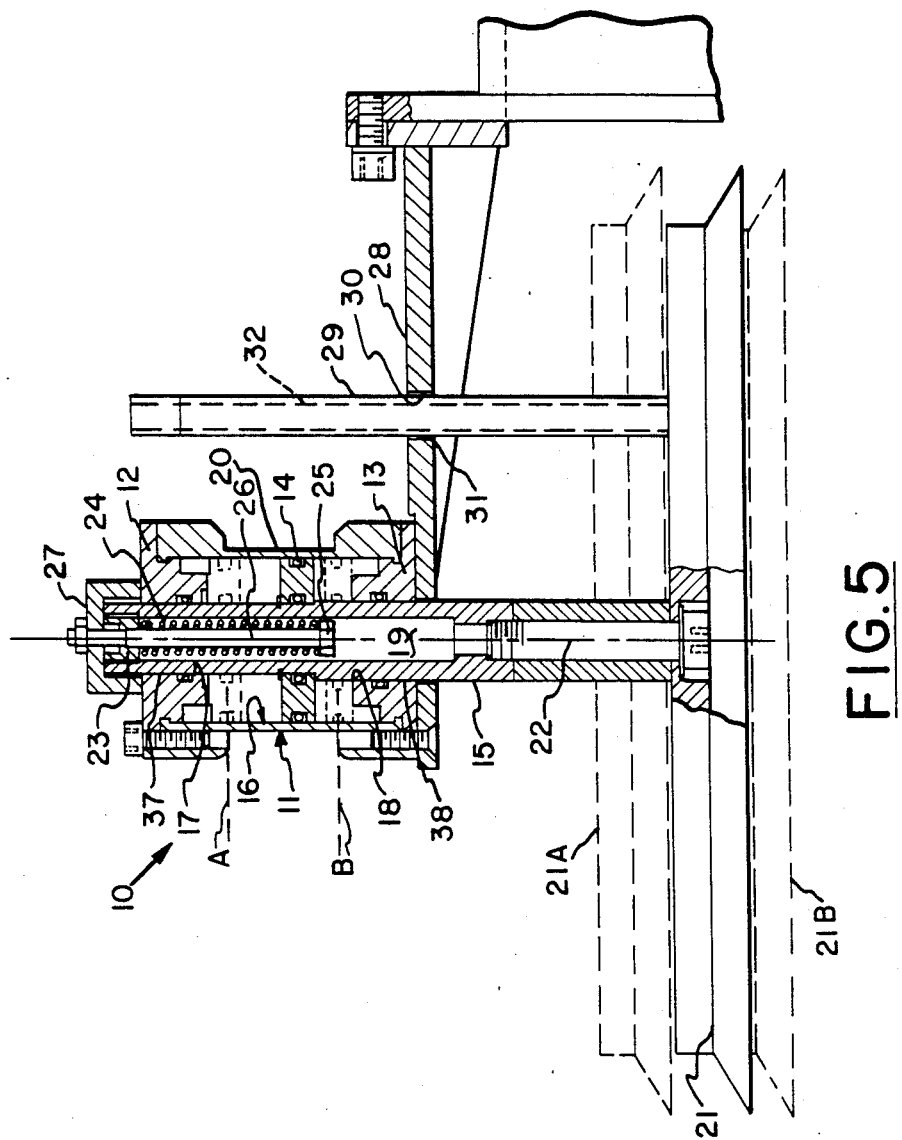
FIG. 5 is a cross-section through an actuator according to a first embodiment of the invention.

The actuators of FIG. 5 and FIG. 6 will first be described, and then the transfer device in which these actuators can be utilized. With reference now to FIG. 5, there is illustrated an actuator 10 according to this invention. The actuator is operated by pneumatic pressure and comprises an actuator body constituted by a pneumatic cylinder body 11 including a cylinder wall 20 and a pair of end walls 12 and 13 which together enclosed a bore 16. A piston 14 is reciprocable within the cylinder body 11 and is operated by air pressure acting on one side or the other of the piston.

The piston 14 is fixed to a hollow rod 15 having a bore 19 therein and which is co-axial with the piston 14 and bore 16 and which extends on each side of the piston to pass sealingly through openings 17 and 18 in each end wall 12 and 13 respectively. The rod 15 is slideably supported by annular guide surfaces 37 and 38 within the openings 17 and 18 respectively. The rod 15 has a tool, in this case a flexible cup 21, attached to its lower end by a securing bolt 22 which screws into the lower end of the bore 19. The upper end of the bore 19 is closed by a plug 23. The terms 'upper' and 'lower' are used only with reference to FIG. 1 and not intended to limit the relative positions in use.

The flexible cup 21 is made of an elastomeric material, for example a polyurethane elastomer and has means for evacuation of air from inside the cup so that the cup can attach itself to, for example, the exterior on a tire carcass by means of the vacuum within the cup.

A compression spring 24 is housed within the bore 19 of the rod 15. One end of the spring 24 reacts against a first abutment constituted by the plug 23 and the other end reacts against a second abutment constituted by the head 25 of a strut 26. The spring 24 biases the plug 23 and the head 25 apart. The strut 26 is arranged co-axially of the bore 19 and passes slidingly through the plug 23 and is anchored to a cap 27 which is axially separable from the end of the rod.

The actuator body 11 is anchored to a support plate 28 and an auxiliary guide pin 29 which has one end fixed to the tool i.e. the flexible cup, and slides freely in an opening 30 in the support plate 28. The opening 30 provides a guide surface 31, which is fixed in position relative to the body 11 so that the guide pin 29 has its longitudinal axis parallel with the axis of the bore 16 in which the piston 14 reciprocates. The guide pin 29 has a longitudinal bore 32 therein which opens into the inside of the cup 21. A vacuum source (not shown) is attachable to the free end of the pin 29.

The piston 14 is operable under air pressure on one side, or the other, of the piston to move between two extreme positions A and B in which it is in abutment with one of the end walls 12 or 13 respectively. With the piston 14 positioned as illustrated in FIG. 5, if air pressure is applied to move the piston downwards, the cap 27 comes up against the end wall 12 which constitutes a third abutment. Since the cap 27 is connected to the head 25 on the strut 26, the head 25 is now held in a fixed position relative to the end wall 12. Continued downwards movement of the piston 14 compresses the spring 24 between the head 25 and the plug 23. This continues until the piston 14 abuts the end wall 13 and the cup 21 is in the position 21 B shown in dotted lines.

On release of the air pressure, the residual load in the spring 24 acting between the plug 23 and head 25 returns the piston upwards until the spring 24 is relaxed. The piston 16 is returned to a mid-stroke position dependant upon the free length of the spring 24. If air pressure is now applied to move the piston 14 upwards the piston will move until it abuts the end wall 12 and the cup 21 is in the position 21 A shown in dotted lines. The upward movement of the piston will cause the cap 27 to move with the rod 15 and separate from the end wall 12.

Figure 6:
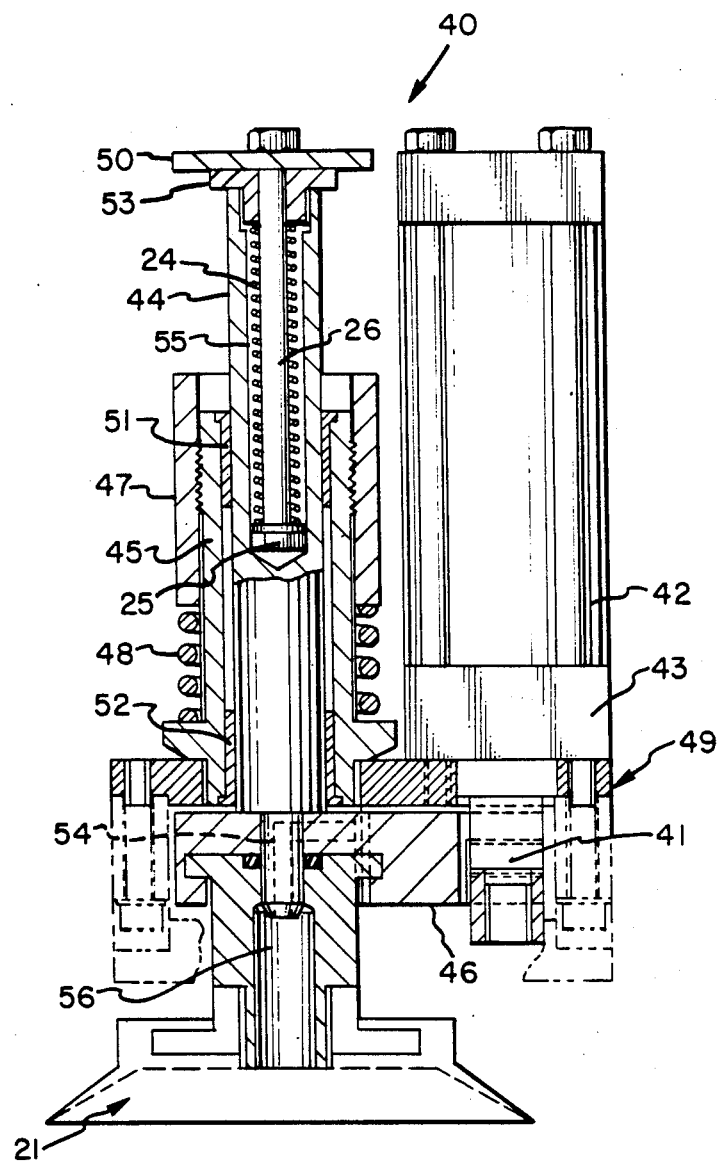
FIG. 6 is a cross-section through another actuator according to a second embodiment of the invention.

With reference now to FIG. 6 there is illustrated another actuator 40 comprising a second embodiment of the invention. Those components in FIG. 2 which are similar to components in FIG. 1 have the same reference numerals.

The actuator 40 comprises a pneumatic cylinder body 42 having a piston therein with an extension 41 thereof passing through the actuator body end wall 43. In this embodiment the flexible cup 21 is not attached, as in FIG. 1, directly onto a rod connected directly to the piston but is attached to a rod 44 which is external of the actuator body 42 and is connected to the piston by a bridge 46. The bridge 46 yokes together the pneumatic cylinder piston extension 41 and the rod 44. The cup 21 is fixed to one end of the rod 44 and sandwiches the bridge 46 between itself and the rod 44. The rod 44 also acts as a guide for movement of the flexible cup 21 and is guided for movement by a pair of bushes 51 and 52 in a surrounding sleeve 45 and is arranged so that its longitudinal axis is parallel with the axis of the piston in the actuator body 42. An adjusting sleeve 47 is arranged co-axially with the sleeve 45 and makes a screw threaded connection therewith so that the position of the sleeve 47 relative to the sleeve 45 can be altered. The sleeve 47 is maintained in its adjusted position by a spring 48. The surrounding sleeve 45 and adjusting sleeve 47 together form a guide sleeve which has an adjustable length.

The end portion of the rod 44 away from the cup 21 has a blind bore 55 therein, the open end of which is closed by a plug 53 which is fastened to the rod 44. A compression spring 24 is housed in the bore 55 and has one end in abutment with the plug 53 and its other in abutment with the head 25 of a strut 26, similarly to FIG. 5, The strut 26 is connected to an abutment disc 50 which can abut the end of the sleeve 47.

Each pneumatic cylinder body 42 and rod 44 is held on a support plate 49 and each cup 21 is connected via a central passageway 56 to a vacuum source which is connected to the cup 21 via a passageway 54 in the bridge 46.

The operation of the actuator is similar to that previously described. On a downward movement of the pneumatic cylinder piston, the cup 21 is moved downwards. This movement is guided by the rod 44 and the disc 50 comes into abutment with the sleeve 47 thereby holding the head 25 of the strut 26 in a fixed position relative to the sleeve 47. Continued downward movement of the rod 44 causes compression of the spring 24 between the head 25 and the plug 53 until the plug 53 bottoms on the sleeve 45. On cessation of operation of the actuator, the spring 24 causes the rod 44 to move upwards, hence moving the cup 21 upwards and returning the pneumatic cylinder piston to a mid stroke position. The amount of upward movement of the guide pin 44 and the cup 21 can be adjusted by altering the relative positions of the sleeves 47 on the sleeve 45.

Figure 1:
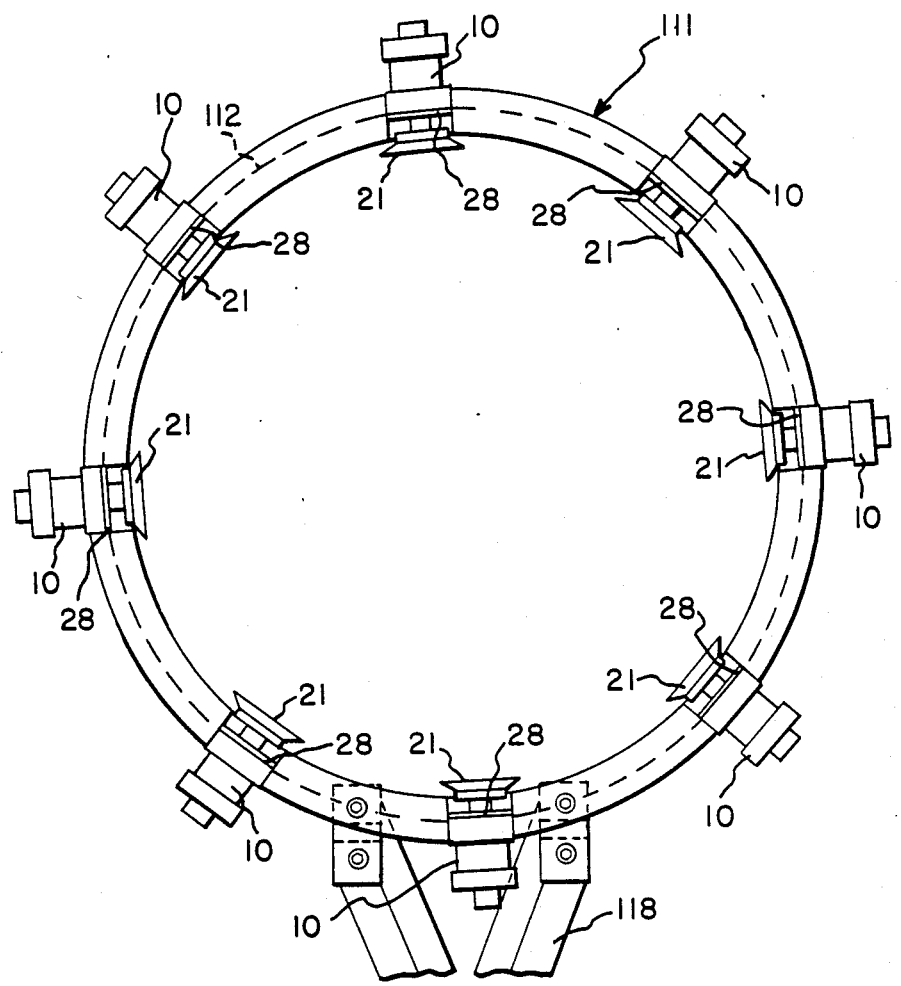
FIG. 1 is an end view of a transfer device according to this invention.
Figure 2:
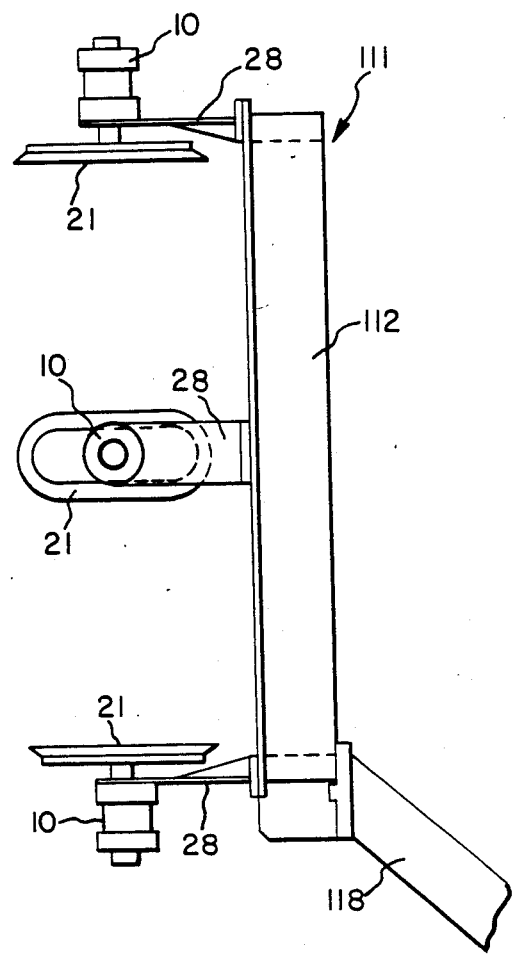
FIG. 2 is a side view of the transfer device of FIG. 1, but with only a representative number of actuators illustrated.

Now with reference to FIG. 1 and FIG. 2, there is illustrated a tire carcass transfer device 111 also according to this invention and in which the above actuators are incorporated.

Figure 4:
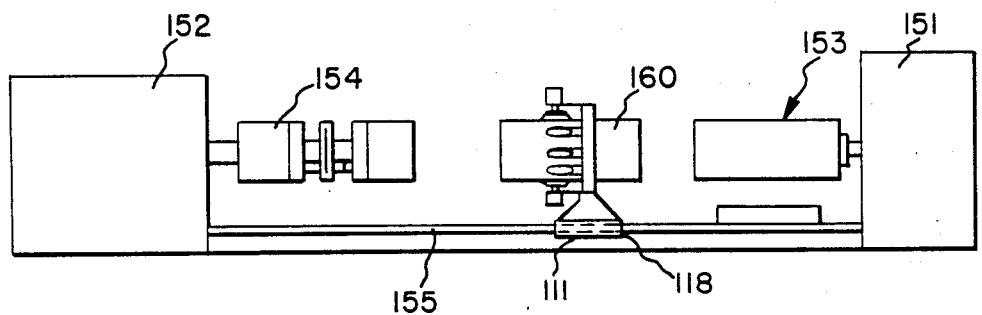
FIG. 4 is a schematic drawing showing the transfer device in use.

The transfer device 111 comprises a hollow circular housing 112 for receiving a cylindrical tire carcass. The housing 112 has eight equiangularly spaced support plates 28 (for convenience only 3 of the plates are shown in FIG. 4) fixed thereon which extend axially on one side only of the housing 112. For the purposes of the description of the housing 112 the terms 'axial' and 'axially' refer to the longitudinal axis of the cylindrical housing and the term 'circumferentially' refers to the circumference of the circular housing. If it is desired to transfer a tire carcass using only a single circular band of actuators and cups 21, then the actuators 10 of FIG. 5 are the preferred embodiments since this actuator is particularly useful for supporting very large cups. The axially outer end portions of the support plates 28, each support an actuator 10, as illustrated in FIG. 5 so that a plurality of said actuators 10 is arranged in a circular band.

The housing 112 has a mounting bracket 118 whereby it can be slideably mounted onto a base for movement between a tire carcass building station and a tire building and forming station.

Whilst the housing is described as providing support for actuators 10 as described with reference to FIG. 5, if the transfer band comprises a plurality of circular bands of cups 21 then the actuators 40 of the type shown in FIG. 6 can also be utilized. The actuators 10 are each fitted with an oval flexible cup 21 from which air can be evacuated and are disposed in a circular band comprising eight actuators 10 and flexible cups 21.

Whilst in the present embodiment the circular band of cups 21 on the housing 112, comprises eight actuators and cups, it is envisaged that the number of actuators and their respective cups could be altered. Furthermore it is envisaged that a transfer device could comprise a plurality of circular bands of suction cups.

Figure 3:
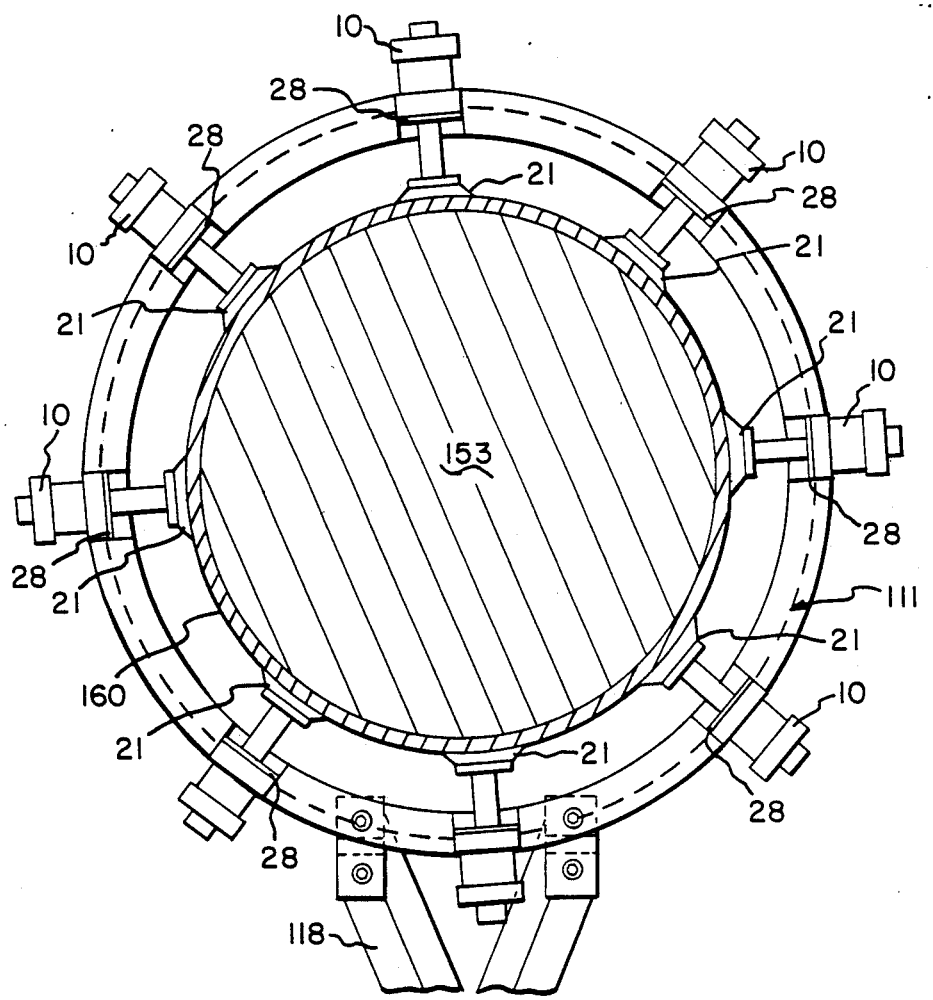
FIG. 3 is a view similar to FIG. 1 but showing transfer device in position over a carcass building drum.

With reference now to FIG. 3 and FIG. 4 there is illustrated the transfer device 111 in use, for conveying a substantially cylindrical uncured tire carcass 160 (sometimes called a carcass band) from a carcass building machine 151 to a tire tire building and forming machine 152. The transfer device 111 is arranged co-axially with both the carcass building drum 153 on machine 151 and a tire forming drum 154 on machine 152, and is slideably mounted by its bracket 118 on a base 115 extending between the two machines 151 and 152.

A cylindrical tire carcass band 160 is built up on the carcass building drum 153. The transfer device 111 moves over the carcass band 160 until it is concentric with and axially located at the mid portion of the carcass. The flexible cups 21 are moved by their respective actuators 10 radially inwards to contact the carcass band 160 and air is evacuated from the cups 21 so that they attach themselves to the outer surface of the carcass band 160. The carcass band 160 is released from the drum 153 by, for example, blowing air through the drum. The air pressure supply to the pneumatic cylinder 11 of the actuators 10 is then cut off and the return springs 24 in each actuator then all move the suction cups 21 radially outwardly by the same predetermined amount, so that the carcass is not distorted from its circular shape when lifting the carcass clear of the drum 153. The carcass has sufficient strength to remain in the circular shape during the subsequent transfer. The carcass is then held in that position by the springs 24 and the transfer device 111 then moves from the carcass building drum 153 to the tire building drum 154 with the tire carcass band 160 held in a cyclindrical configuration by the cups 21. The transfer apparatus 111 passes over the tire building drum 154 so that the carcass is co-axial with the tire building drum.

The tire building drum 154 expands to make contact with the carcass, and the vacuum to the cups 21 is cut-off. The cups 21 are then moved by their respective actuator 10 radially outwards to their outermost positions. The transfer apparatus can now be moved from the tire building drum leaving the carcass band thereon.

While the invention has been described with reference to the specific examples illustrated, it is to be understood that minor changes could be made without departing from the spirit and scope of the invention.

What is claimed is:

1. An actuator operable for movement of a tool and which comprises, an actuator body, a piston having a reciprocating stroke within the actuator body, a rod with a coaxial bore therein operably connected with the piston and which is connectable with said tool, a first abutment associated with the rod and having a fixed axial position along the rod, a second abutment also associated with the rod and being axially displaceable along the rod, a compression spring within said coaxial bore biasing the first and second abutments apart, the first abutment including a plug, closing the coaxial bore in the rod, and connected to one end of the compression spring, and a strut passing coaxially through the center of the spring has a head thereon which constitutes said second abutment in contact with the other end of the spring, said strut passing slidingly through said plug a third abutment having a fixed position and which is operably engageable by the first abutment after a predetermined movement of the piston along its stroke, and the first abutment further including a cap connected to said strut which cap is axially separable from the rod and which is engageable with said third abutment so the continued movement of the piston along said stroke results in compression of the spring so that on cessation of operation of the actuator, the spring returns the piston to a mid stroke position.

2. An actuator as claimed in 1 wherein said rod passes through the actuator body and is coaxially fixed to said piston and extends on each side thereof, the rod being slideably engageable with the actuator body so as to guide the piston during its reciprocating stroke.

3. An actuator as claimed in claim 2 wherein the third abutment is constituted by the actuator body.

4. An actuator as claimed in anyone of claims 1, 2, or 3 wherein there is a guide surface fixed relative to the actuator body, and a guide pin supports the movement of said tool, said guide pin being located externally of the actuator and being connected at one end to said tool, and sliding on said guide surface.

5. An actuator as claimed in claim 1, wherein said rod is external of the actuator body, and a bridge yokes together the rod with said actuator.

6. An actuator as claimed in claim 5 wherein a guide sleeve surrounds said rod to guidingly support movement of said rod, and the third abutment is constituted by said guide sleeve.

7. An actuator as claimed in claim 6 wherein the overall length of the guide sleeve is adjustable.

* * * * *